Dec. 12, 1933.   C. A. SAWTELLE   1,938,979
HYDRAULIC BRAKE MECHANISM
Filed Aug. 9, 1929   2 Sheets-Sheet 1
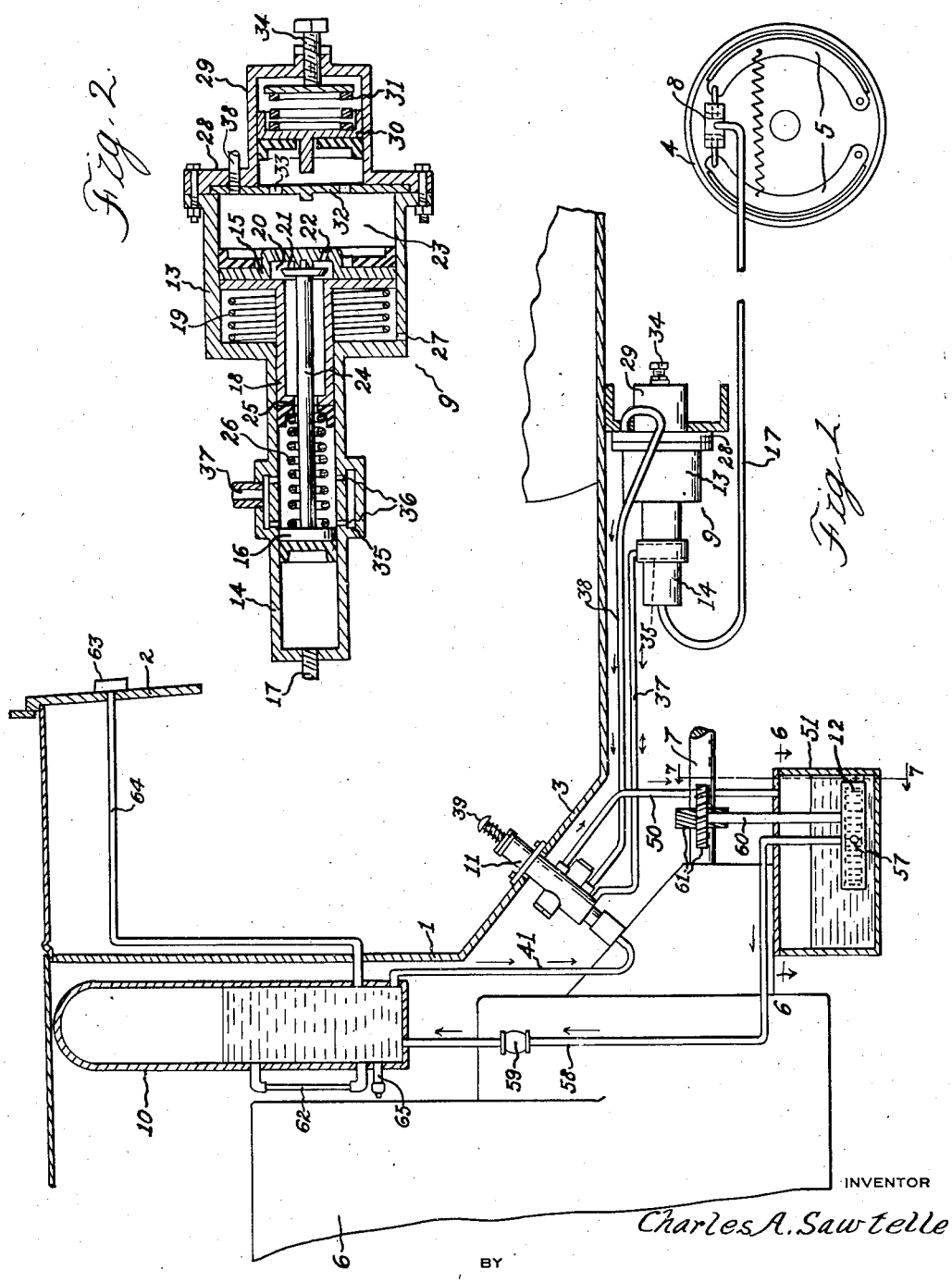
INVENTOR
Charles A. Sawtelle
BY
ATTORNEY Dec. 12, 1933.  C. A. SAWTELLE  1,938,979
HYDRAULIC BRAKE MECHANISM
Filed Aug. 9, 1929  2 Sheets-Sheet 2
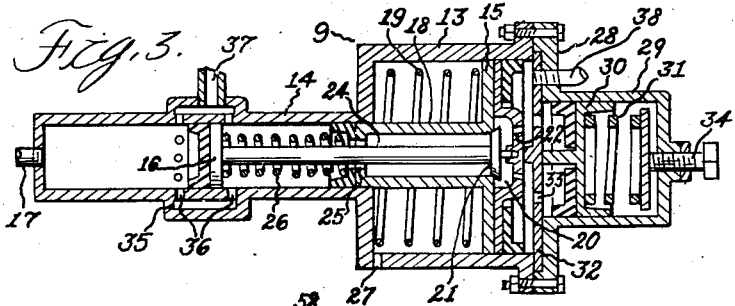
Fig. 3.
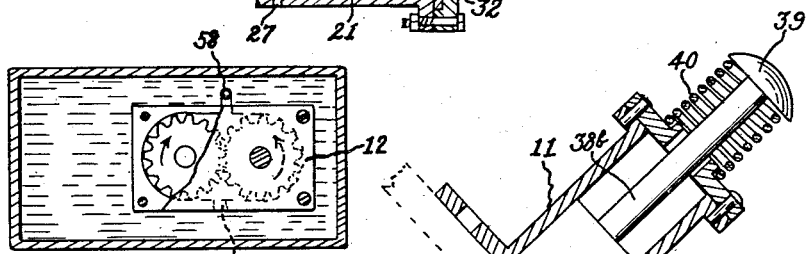
Fig. 6.
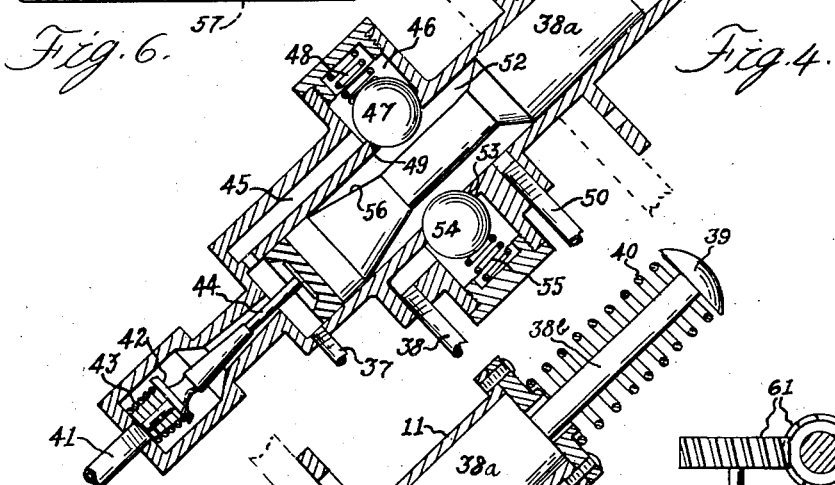
Fig. 4.
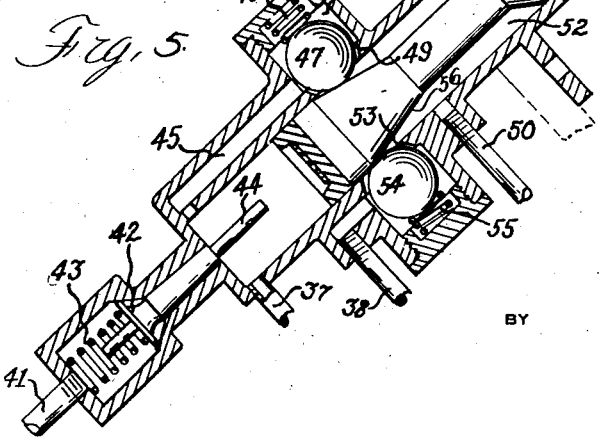
Fig. 5.
Fig. 7.
INVENTOR
Charles A. Sawtelle
BY
ATTORNEY Patented Dec. 12, 1933

1,938,979

UNITED STATES PATENT OFFICE 1,938,979

HYDRAULIC BRAKE MECHANISM

Charles A. Sawtelle, Detroit, Mich., assignor, by direct and mesne assignments, to S. and D. Engineering Company, Detroit, Mich., a corporation of Michigan Application August 9, 1929. Serial No. 384,611

13 Claims. (Cl. 188—152)

This invention relates to brake operating mechanisms and particularly to hydraulically operated brakes.

An object of the invention is to minimize the muscular effort required for braking, through use of a liquid-operable motor to apply the brake and transmission of an energizing pressure to said motor from a liquid body stored under substantially constant superatmospheric pressure, the muscular effort involved being only that required to open a valve controlling the liquid.

Another object is to store a body of fluid under pressure, utilize its storage pressure to energize a motor for taking up the normal clearance between a brake drum and coacting brake shoe or band, multiply the pressure of said fluid by means of differential pistons and cylinders, and employ the multiplied pressure for further energizing said motor to apply the actual braking effort.

Still another object is to provide a pump for returning liquid exhausted from the cylinder of a brake operating appliance to a reservoir in which such liquid is stored under superatmospheric pressure, and to drive said pump from the motor of the vehicle equipped with said brake.

A further object is to adapt a piston to be moved within a cylinder under liquid pressure and to provide for a slight increase in volume of the pressure chamber of said cylinder with a corresponding relief of pressure responsive to a predetermined rise of such pressure.

These and various other objects the invention attains by the construction hereinafter described and illustrated in the accompanying drawings, wherein:

Fig. 1 is a diagrammatic view in side elevation and partial section of the herein disclosed brake mechanism.

Fig. 2 is an axial sectional view of a pressure-multiplying device comprising differential pistons and cylinders, showing the brake applying position of the pistons.

Fig. 3 is another similar view of the same, showing the normal positions of the pistons.

Fig. 4 is a vertical sectional view of a valve controlling the flow of the pressure-transmitting liquid, showing the brake applying positions of the parts.

Fig. 5 is a similar view, showing the normal positions of the parts.

Fig. 6 is a horizontal sectional view, taken upon the line 6—6 of Fig. 1, showing a sump into which liquid is vented after an application of the brakes, and a pump for returning such liquid to the storage reservoir.

Fig. 7 is a sectional elevation of the same taken upon the line 7—7 of Fig. 1.

In these views, the reference character 1 designates the dash of a motor vehicle, 2 the instrument board thereof, 3 the foot board, 4 the drum and 5 the brake shoes or the like of one of the brakes of said vehicle, 6 the vehicle engine, and 7 the transmission shaft or some other part driven by said engine.

The present invention primarily comprises a fluid pressure responsive motor 8 adapted to apply said brake, a device 9 for multiplying fluid pressure applied to said motor, a reservoir 10 for storing under superatmospheric pressure a liquid for energizing the motor 8, a valve 11 controlling the flow of said liquid, and a pump 12 for returning liquid to said reservoir after a braking operation.

The pressure multiplying device 9 comprises differential coaxial cylinders 13 and 14, and differential pistons 15 and 16 reciprocatory in said cylinders. Said cylinders have rigidly connected communicating ends, and the other end of the smaller cylinder 14 is connected by a duct 17 with the motor 8. Rigidly carried by the larger piston 15 is a hollow plunger 18 which is slightly entered in the smaller cylinder 14 when said piston is in the normal retracted position to which it is urged by a coiled spring 19. When the brakes are being applied, the piston 15 is projected as Fig. 2 discloses, the plunger 18 then more fully entering the cylinder 14. The piston 15 is preferably of a composite construction especially adapting it to form a central valve chamber 20 in which a valve member 21 operates to control communication of said chamber with the passage formed by said plunger. Ports 22 place the chamber 20 in constant communication with the liquid-receiving space 23 of the larger cylinder. A stem 24 rigidly connects the valve member 21 to the smaller piston 16, an opening 25 for the flow of liquid being formed around said stem in the end of said plunger remote from the piston carrying same. A coiled spring 26 compressed between the plunger 18 and piston 16 tends to maintain the valve member 21 normally seated. When the latter is unseated, it engages the ported wall of the piston 15, adapting the latter and the stem 24 to actuate the piston 16 during a braking control. The portion of the cylinder 13 within which the spring 19 is coiled is vented to the atmosphere as indicated at 27.

The liquid-receiving end portion of the cylinder 13 is closed by a head 28 having a central cylindrical extension 29 in which slidably fits an auxiliary piston 30, urged by a coiled spring 31 toward the piston 15. A plate 32 clamped between the cylinder 13 and head 28 forms a stop, limiting response of the piston 30 to the spring 31, and is ported as indicated at 33 to maintain communication between the liquid chamber of the larger cylinder and the extension thereof formed within the enlargement 29. A screw 34 tapped into the outer end of the enlargement 29 carries within the latter an abutment for the spring 31, and provides for regulably stressing said spring.

For admitting, and also for venting, liquid to and from the cylinder 14, the latter is formed in its mid portion with an annular enlargement within which a passage 35 surrounds said cylinder, said passage communicating with the cylinder through two annular series of ports 36 between which the piston 16 lies in its retracted position, as best seen in Fig. 3. A duct 37 leads from the passage 35 to the valve 11, being controlled by the latter, as will presently appear.

For venting liquid from the cylinder 13, a duct 38 opens from the liquid chamber of said cylinder through the head 28 and leads to the valve 11 for control thereby. Said valve is mounted at a suitable inclination in the foot board 3 and has the form of an elongated cylinder in which operates a plunger valve member 38a, from which a stem 38b projects freely through the upper end of said casing and is surmounted by a suitable foot pedal 39. Between the latter and the valve casing is coiled a spring 40, normally urging the valve member 38a to the raised position illustrated in Fig. 5.

The lower end of the control valve casing is connected by a duct 41 with the lower end of the storage reservoir 10, and a valve member 42 is adapted to be seated by a spring 43 to normally cut off communication of said duct and valve casing. A pin 44, projecting from said valve member axially into the control valve casing, is engageable by the plunger valve 38a during the final portion of its downward stroke to unseat said valve member.

The duct 37 communicates with the lower end of the control valve casing and said end furthermore is connected by a passage 45 (which may be cored in the wall of the valve casing) with a valve chamber 46 within which a ball valve 47 is normally seated by a coiled spring 48 to close a port 49 opening into the mid portion of the control valve casing. Also opening into said portion of that casing is a duct 50 which leads to a sump 51 within which said pump 12 is mounted. An intermediate portion of the plunger valve member 38a is reduced in diameter to form an annular space 52 for placing the duct 50 and passage 45 in communication when the ball valve 47 is unseated.

Further formed in an intermediate portion of the valve casing is a port 53 controlled by a ball valve 54 normally seated by a spring 55. When said valve is unseated, communication is established between the vent duct 50 leading to the sump 51 and the liquid vent duct 38 which leads from the liquid chamber of the cylinder 13.

Between its lower end portion and its reduced intermediate portion the plunger 38a is conically tapered as indicated at 56 to form a cam surface acting in the raised position of said plunger to unseat both ball valve members 47 and 54, as appears in Fig. 5. When said plunger is downwardly actuated, its cam face 56 rides clear of said ball members, permitting the latter to seat. Preferably the port 53 is offset to some extent toward the lower end of the control valve casing from the port 49, whereby upon return of the plunger valve to its normal raised position the ball member 54 is unseated in advance of the ball 47. The advantage derived from this relation is hereinafter discussed.

The pump 12 is preferably of a gear type, as best illustrated in Figs. 6 and 7, its inlet 57 being open to the lower portion of the sump, and its outlet being connected by a liquid return duct 58 with the reservoir 10. A suitable one way valve 59 of any ordinary construction is interposed in the duct 58 to prevent any return flow of liquid from the reservoir to the sump. The pump 12 is, of course, required to generate a sufficient pressure to overcome the storage pressure prevailing in the reservoir 10.

A drive shaft 60 for the pump 12 rises through the top of the sump 51, and a drive connection thereto from the engine-driven shaft 7 is established by a pair of spiral gears 61 or the like.

A suitable liquid level gauge glass 62 may be mounted upon said reservoir to indicate variations of the liquid level therein, and a pressure gauge 63 mounted upon the instrument board is connected to the reservoir 10 preferably below the minimum liquid level therein by a duct 64.

Any suitable provision may be made for initially introducing a volume of compressed air into the upper portion of the reservoir 10 and for replenishing such air as occasion arises. As illustrated, an ordinary pneumatic filler tube 65 forms an air inlet to said reservoir, said tube carrying any suitable one way valve member (such as is commonly employed for inflation of pneumatic tires) to resist escape of fluids from said reservoir. It is preferred to mount said filler tube on the lower portion of said reservoir, where it will be under constant liquid seal.

Considering now the operation of the described brakes, it is first to be understood that normally the pistons 15 and 16 are retracted in the cylinders 13 and 14, and the valve member 21 is seated by the spring 26, as clearly appears in Fig. 3. Also, the plunger valve member 38 is normally raised as Fig. 5 illustrates, the liquid supply valve 42 being closed by its spring 43, and both ball valves being held unseated by the cam portion 56 of the plunger valve member. Thus the cylinders 13 and 14 are both vented to the annular space 52, the former by way of the duct 38, and the latter by the duct 37 and passage 45. Said annular space being connected by the duct 50 with the sump 51, it follows that both cylinders will be in free communication with said sump.

When a braking control is exercised by depressing the foot pedal 39, the resulting downward actuation of the plunger valve 38a first releases the ball valve members 47 and 54, cutting off communication between the cylinders 13 and 14 and the sump 51. Continued actuation of said plunger valve then engages it with the pin 44 on the valve member 42, regulably unseating the latter. Air compression in the reservoir 10 now induces a flow of liquid through the ducts 41 and 37, ports 36, cylinder 14, and duct 17 to the motor 8, energizing the same to take up slack or normal clearance between the brake shoes 5 and drum 4, the pistons 15 and 16 in the meanwhile remaining stationary and the valve member 21 remaining closed.

The taking up of slack in the brake immediately results in a building up of liquid-static pressure in the duct 17, cylinder 14, and ducts 37 and 41, whereby the spring 26 is overcome and the valve member 21 unseated. The fact that such liquid static pressure acts at both sides of the piston 16 does not materially affect the described action since the liquid pressure acting directly upon said valve member largely counteracts the reversely acting fluid pressure exerted upon the piston 16. Unseating travel of the valve member 21 is limited by its engagement with the ported wall of the piston 15. Liquid under storage pressure now flows through the plunger 18 and ports 22 into the pressure chamber 23 of the cylinder 13 and displaces the piston 15 against the resistance offered by the spring 19. The valve member 21 and stem 24 form a drive connection from the piston 15 to the piston 16 during such travel, and initial actuation of the latter piston closes the ports connecting the free end portion of the cylinder 14 to the duct 37. Continued advance of the two pistons then subjects the liquid in the duct 17 to a pressure much superior to that utilized to take up the slack, owing to the pressure-multiplying effect of the differential pistons.

Responsive to such multiplied pressure, the motor 8 is powerfully energized to apply the brake, the applied power, however, being regulable according to the degree of opening of the valve member 42. As the pressure acting to advance the piston 15 builds up, the piston 30 yields more or less, according to the regulation effected by the screw 34, and consequently the objectionably unyielding control ordinarily involved by employment of a liquid control medium is avoided. That is to say, the piston 30 may play back and forth in its cylinder 29 according as pressure acting in the cylinder 13 arises or falls, thus securing somewhat the effect of an expansive fluid medium. It is, of course, to be understood that in thus applying the brakes, the valve member 21 remains unseated, since the multiplied pressure created by the piston 16 reacts continuously against the latter to overcome the spring 26.

When foot pressure applied to the pedal 39 is reduced, the resultant upward travel of the plunger 38a (responsive to the spring 40) first permits closing of the valve member 42. A further relief travel of said plunger engages the cam face 56 with the ball valve 54, unseating the latter, and allowing liquid to vent from the pressure chamber 23 through the ducts 38 and 50 to the sump 51. This results in retraction of both pistons, responsive to the pressure in the line 17 and also to the spring 19, and quickly relieves pressure in said line. A slight further relief travel of the plunger additionally unseats the ball valve 47 and affords additional relief to pressure in the cylinder 14. For complete and immediate relief of pressure the plunger 38a will be permitted to rise, unretardedly. The operator may, however, retard the unseating of either or both ball valves or may permit only one thereof to unseat when a gradual release of the brakes is desired.

Since the pump is geared to the transmission shaft, the same is continuously driven, whenever the vehicle is under way. Consequently, the liquid which is vented to the sump 51, following a braking control, is quickly returned to the reservoir 10, when or as the vehicle travel is continued.

The described braking system is superior to one employing air only as the fluid braking medium; as such a medium is much more difficult to confine than a liquid, and it is furthermore necessary in an air system to employ an air compressor which is initially expensive and is difficult to maintain.

As compared to a purely hydraulic system, the described operating arrangement is to be preferred, in as much as the applied muscular pressure in a hydraulic system must be adequate to energize the brake-applying motor, whereas the present invention requires only such slight muscular effort as is necessary to operate the control valve.

Utilization of the liquid under its storage pressure to take up the slack, and the subsequent multiplication of liquid pressure to effect actual braking reduces the required volume of actuating liquid and minimizes the size of the storage reservoir.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. In a brake operating mechanism, means for storing a body of fluid under super-atmospheric pressure, a high pressure and a low pressure cylinder axially aligned, differential pistons operating in said cylinders, means connecting said pistons for actuation of one by the other, a brake, a fluid-responsive motor for operating said brake, a fluid pressure transmitting connection to said motor from said high pressure cylinder, means for transmitting fluid pressure to both of said cylinders from said storage means, and a valve controlling said connection to the low pressure cylinder and responsive to pressure in the high pressure cylinder.

2. A device for multiplying fluid pressures, comprising a pair of coaxial cylinders differing in diameter, a piston reciprocatory in each of said cylinders, an actuating connection between said pistons, a valve member controlling delivery of an energizing fluid to the larger diameter cylinder, and a common means for actuating the smaller from the larger piston and for controlling said valve member.

3. A device for multiplying fluid pressures comprising a cylinder closed at one end, a cylinder of less diameter communicating with the other end of the first mentioned cylinder, differential pistons reciprocatory in said cylinders, the larger thereof being ported, means for venting fluid from the closed end portion of the larger cylinder, a connection between the two pistons affording them a slight relative travel, a valve member controlling said piston port adapted to be unseated by such relative travel, a spring normally seating said valve member, and means for admitting fluid under pressure to the smaller cylinder at each side of the piston.

4. A device for multiplying fluid pressures comprising two coaxial cylinders differing in diameter and having communicating ends and closed at their remote ends, differential pistons reciprocatory in said cylinders, a plunger rigidly extending from the larger piston and reciprocatory in the lesser diameter cylinder, said plunger and larger piston having a passage therethrough, means for delivering a fluid under pressure to the high pressure cylinder between the smaller piston and said plunger, a connection between the two pistons affording them a slight relative travel, a valve member controlling said passage adapted to be unseated by such relative travel, and a spring normally seating said valve member.

5. A device for multiplying fluid pressures comprising a cylinder having an outlet for an energizing fluid, an actuable piston reciprocatory in said cylinder to and from said outlet, a second cylinder of larger diameter, substantially coaxial with the first mentioned cylinder, and having an inlet for an energizing fluid, an actuating piston in the larger diameter cylinder movable toward the lesser diameter cylinder, under pressure of fluid admitted through said inlet, an actuating connection from the actuating piston to the actuable piston, affording said pistons a limited relative travel, yieldable means opposing a predetermined resistance to movement of the smaller toward the larger piston, means for delivering an energizing fluid to the smaller cylinder between its outlet and the smaller piston, and means for admitting an energizing fluid to said inlet of the larger cylinder responsive to movement of the smaller toward the larger piston.

6. In a device for multiplying fluid pressures, as set forth in claim 5, a spring yieldably resisting travel of one of said pistons toward said fluid outlet.

7. A device for multiplying fluid pressures comprising a cylinder having an outlet for an energizing fluid in an end portion thereof and formed between its ends with an inlet for such fluid, an actuable piston reciprocatory in said cylinder to displace said fluid through said outlet, means normally yieldably retracting said piston from said outlet to a position establishing communication between said inlet and outlet, means for delivering an energizing fluid to said inlet, a second cylinder of greater diameter than the first mentioned cylinder, an actuating piston reciprocatory in the larger diameter piston, an actuating connection from the actuating to the actuated piston, and means responsive to a predetermined rise of fluid pressure in the smaller diameter cylinder for establishing a delivery of energizing fluid to the larger diameter cylinder, the actuable piston being adapted to close said inlet of the smaller diameter cylinder when actuated by the actuating piston.

8. In a device of the character described, the combination with a cylinder and a piston reciprocatory in said cylinder and forming with the cylinder an expansible pressure chamber, means for delivering a fluid under pressure to said chamber, a relatively small cylinder carried by one of the heads of the first-named cylinder, a piston reciprocatory in said small cylinder to and from said pressure chamber, means yieldably urging the last-named piston toward the pressure chamber, and a member clamped between said cylinder head and the first-named cylinder, limiting response of the last-named piston to the last-named means, said member having an opening maintaining communication between the pressure chamber and the smaller cylinder.

9. In a device for multiplying fluid pressures, two coaxial cylinders differing in diameter and oppositely extending from each other, two pistons each reciprocatory in one of said cylinders, and conforming in diameter to said cylinders, a pressure chamber being formed in the larger cylinder between the piston therein and the end of said cylinder remote from the smaller cylinder, and the smaller cylinder having a fluid outlet in its end portion remote from the larger cylinder, an actuating connection from the larger to the smaller piston, and means for delivering a fluid under pressure to the smaller cylinder and thence through an opening in the larger piston to said pressure chamber, and means for delivering a fluid under pressure to the smaller cylinder for discharge through said outlet.

10. A device for multiplying fluid pressures as set forth in claim 9, comprising a plunger carried by the larger piston maintaining sliding engagement with the smaller cylinder in all operative positions of the larger piston, said plunger forming a passage for the said delivery of fluid to the pressure chamber.

11. A device for multiplying fluid pressures, as set forth in claim 4, said spring being compressed between said plunger and the smaller piston.

12. A device for multiplying fluid pressures comprising a pair of coaxial cylinders differing in diameter, differential pistons reciprocatory in said cylinders, the larger piston and cylinder jointly forming a fluid pressure chamber, means for delivering a fluid under pressure to said pressure chamber, and an actuating connection from the larger to the smaller piston, affording said pistons a limited relative motion to and from each other, said connection exercising a control of fluid delivery to said pressure chamber.

13. In a device for multiplying fluid pressures, a pair of coaxial cylinders differing in diameter, differential pistons reciprocatory in said cylinders, a plunger carried by the larger piston, working in the smaller cylinder, means for actuating the smaller from the larger piston, and means for delivering an energizing fluid to the larger cylinder through said plunger and through the larger piston.

CHARLES A. SAWTELLE.